United States Patent
Mahindra et al.

(10) Patent No.: US 9,723,532 B2
(45) Date of Patent: Aug. 1, 2017

(54) INTELLIGENT WIFI-OFFLOADING FOR NEXT-GENERATION MOBILE NETWORKS

(71) Applicant: NEC Laboratories America, Inc., Princeton, NJ (US)

(72) Inventors: Rajesh Mahindra, Princeton, NJ (US); Karthikeyan Sundaresan, Howell, NJ (US); Mustafa Arslan, Princeton, NJ (US); Sampath Rangarajan, Bridgewater, NJ (US); Hariharasudhan Viswanathan, Highland Park, NJ (US)

(73) Assignee: NEC Corporation, Tokyo (JP)

( * ) Notice: Subject to any disclaimer, the term of this patent is extended or adjusted under 35 U.S.C. 154(b) by 223 days.

(21) Appl. No.: 14/565,032

(22) Filed: Dec. 9, 2014

(65) Prior Publication Data

US 2015/0163716 A1    Jun. 11, 2015

Related U.S. Application Data

(60) Provisional application No. 61/913,639, filed on Dec. 9, 2013.

(51) Int. Cl.
*H04W 4/00*     (2009.01)
*H04W 36/22*    (2009.01)
(Continued)

(52) U.S. Cl.
CPC ........... *H04W 36/22* (2013.01); *H04W 36/14* (2013.01); *H04W 8/082* (2013.01); *H04W 28/08* (2013.01); *H04W 84/12* (2013.01)

(58) Field of Classification Search
None
See application file for complete search history.

(56) References Cited

U.S. PATENT DOCUMENTS 9,137,654 B1 *   9/2015  Qu ........................ H04W 8/12
2004/0252707 A1 * 12/2004  Crocker ................ H04L 45/00
                                                 370/402

(Continued)

OTHER PUBLICATIONS

Signals Research Group, The LTE Standard Developed by a global community to support paired and unpaired spectrum developments,Apr. 2014, Ericsson and Qualcomm, all.*

(Continued)

*Primary Examiner* — Omar Ghowrwal
*Assistant Examiner* — Angel Brockman
(74) *Attorney, Agent, or Firm* — Joseph Kolodka

(57) ABSTRACT

A system for traffic management between a WiFi network and an LTE network that includes a network interface assignment module for determining from an operator side of the WiFi network and the LTE network a set of WiFi Access Points (APs) and LTE base stations for each user that provides a least a highest quality of experience for each of the users using input strength for all users to potential WiFi access points and LTE base stations. The system may further include an interface switching service (ISS) module that includes a control logic and a network HTTP proxy for delivering network switching instructions to devices of users. The control logic receiving instructions from the NIA module and sending signal to the devices of the users to switch from WIFI and LTE networks through the LTE network based upon signal strength of the users.

19 Claims, 5 Drawing Sheets

(51) Int. Cl.
*H04W 36/14* (2009.01)
*H04W 8/08* (2009.01)
*H04W 28/08* (2009.01)
*H04W 84/12* (2009.01)

(56) References Cited

U.S. PATENT DOCUMENTS

| | | | | |
|---|---|---|---|---|
| 2007/0204155 A1* | 8/2007 | Dutta | ................... | H04L 63/062 |
| | | | | 713/168 |
| 2011/0066703 A1* | 3/2011 | Kaplan | ............... | H04L 65/4084 |
| | | | | 709/219 |
| 2011/0261816 A1* | 10/2011 | Morris | ................... | H04L 45/00 |
| | | | | 370/392 |
| 2014/0233386 A1* | 8/2014 | Jamadagni | ............ | H04W 36/22 |
| | | | | 370/235 |

OTHER PUBLICATIONS 802.11ac: The Fifth Generation of Wifi Technical White Paper, Mar. 2014, Cisco, all.*

R Fielding et al, Hypertext Transfer Protocol—HTTP, Mar. 2008, University of Maryland, all.*

Deb, S., et al., "MOTA: Engineering an Operator Agnostic Mobile Service," MobiCom '11, Proceedings of the 17th annual international conference on Mobile computing and networking, 2011. (pp. 133-144).

* cited by examiner

TABLE 1: NIA ALGORITHM

1: INPUT: $\forall i \in \mathcal{N}$ (# of Active user flows),
   $\forall j \in \mathcal{B}$ (# of WiFi APs), $\mathcal{N}_j \subseteq \mathcal{N}$ (# of Active user flows within the coverage of AP $j$.
2: OUTPUT: User flow Association $\mathcal{A}_j, \forall j \in \mathcal{B}$
3: $\pi \leftarrow \{\mathcal{B}\}, \mathcal{A}_0 \leftarrow \{\mathcal{N}_0\}$
4: $\mathcal{L}_j \leftarrow \{\mathcal{N}_j\}, \forall j \in \mathcal{B}$
5: % Outer Loop
6: for $x \in [1 : |\mathcal{B}|]$ do
7:    % Inner Loop
8:    for $j \in \pi$ do
9:      $\mathcal{A}_j = \emptyset$
10:     $\mathcal{A}_{0j} = \mathcal{A}_0 \cup \mathcal{L}_j$
11:     for $i \in \mathcal{L}_j$ do
12:       $i^* = \arg\max_{(i) s.t. i \notin \mathcal{A}_j} \{\sum_{k \in \mathcal{A}_j \cup i} U(t_{jk}) + \sum_{k \in \mathcal{A}_{0j} - i} U(t_{0k}) - \sum_{k \in \mathcal{A}_j} U(t_{jk}) - \sum_{k \in \mathcal{A}_{0j}} U(t_{0k})\}$
13:       $\mathcal{A}_j \leftarrow \mathcal{A}_j \cup i^*$
14:       $\mathcal{A}_{0j} \leftarrow \mathcal{A}_{0j} - i^*$
15:     end for
16:     $U_j = \sum_{i \in \mathcal{A}_j} U(t_{ji}) + \sum_{i \in \mathcal{A}_0} U(t_{0i})$
17:    end for
18:    $b \leftarrow \arg\max_j U_j$
19:    $\pi \leftarrow \pi - b$
20:    $\mathcal{L}_j \leftarrow \mathcal{N}_j - \mathcal{A}_b, \forall j \in \mathcal{B}, j \neq b$
21:    $\mathcal{A}_0 \leftarrow \mathcal{A}_{0b}$
22: end for

INTELLIGENT WIFI-OFFLOADING FOR NEXT-GENERATION MOBILE NETWORKS

RELATED APPLICATION INFORMATION

This application claims priority to provisional application Ser. No. 61/913,639 filed on Dec. 9, 2014, incorporated herein by reference.

BACKGROUND

Technical Field

The present invention relates to employing WiFi access to relieve pressure on cellular networks to offer faster data rates to meet the increasing demands of modern applications over the cellular network, and more particularly to controlling WiFi offloading when the WiFi network is congested.

Description of the Related Art

Mobile operators are leveraging WiFi access to relieve pressure on their cellular networks and offer faster data rates to meet the surging demand of applications. However, in today's networks, operators either lack or naïve mechanisms to control the way end users access their WiFi networks. As operators deploy LTE networks that offer significantly higher data rates, intelligent traffic offloading to WiFi networks can enable operators to meet the rising traffic demand in a cost effective manner.

SUMMARY

The present disclosure provides an adaptive traffic management system. In this regard, the present disclosure implements ATOM, which is an end-end solution for adaptive traffic management in heterogeneous WiFi and LTE deployments. In some embodiments, ATOM consists of two novel components: (i) a practical network interface selection algorithm that maps user traffic across WiFi and LTE to optimize user quality of experience (QoE), and (ii) an interface switching service that provides seamless re-direction of ongoing user sessions to enable dynamic traffic management in a cost-effective and standards-compatible manner.

In one embodiment, a method of traffic management is provided for data transmission between a WiFi network and an LTE network that may include determining from an operator side of the WiFi network and the LTE network, the number of users on a WiFi network and a number of users on the LTE network, wherein there are multiple access points for the WiFi network within a cell for the LTE network. In a following step, the method may include measuring from the operator side congestion of data transmitted on at least the WiFi network. In a following step, the method may include assigning users to the WiFi network and the LTE network using a traffic management system. In some embodiments, the traffic management system may include a network interface assignment (NIA) component, and an interface switching service (ISS) component. The interface switching service (ISS) comprises a network control logic and a network HTTP proxy. The network control logic receives instructions from the NIA component, and sends signal to the users to switch between the WIFI network and LTE network through the LTE network based upon signal strength of the users. The data flows for HTTP download traffic to the users employs the network HTTP proxy, and data flows for HTTP video and streaming does not use the network HTTP proxy to avoid backhauling traffic through the WiFi and LTE network.

In another aspect, a system for traffic management between a WiFi network and an LTE network is provided that includes a network interface assignment module for determining from an operator side of the WiFi network and the LTE network a set of WiFi Access Points (APs) and LTE base stations for each user that provides a least a highest quality of experience for each of the users using input strength for all users to all potential WiFi access points and LTE base stations. The system may further include an interface switching service (ISS) module that comprises a control logic and a network HTTP proxy for delivering network switching instructions to devices of users. The control logic receives instructions from the NIA module and sends signal to the devices of the users to switch from WIFI and LTE networks through the LTE network based upon signal strength of the users. The data flows for HTTP download traffic to the users employ the network HTTP proxy, and data flows for the HTTP video and streaming do not use the network HTTP proxy to avoid backhauling traffic through the WiFi and LTE network.

In yet another aspect, the disclosure provides a computer program product that includes a non-transitory computer readable storage medium having computer readable program code embodied therein for performing a method of traffic management for data transmission between a WiFi network and an LTE network. The method may include determining from an operator side of the WiFi network and the LTE network, the number of users on a WiFi network and a number of users on the LTE network, wherein there are multiple access points for the WiFi network within a cell for the LTE network, and measuring from the operator side congestion of data transmitted on at least the WiFi network. The method may also include assigning users to the WiFi network and the LTE network using a traffic management system that includes a network interface assignment (NIA) component, and an interface switching service (ISS) component. The interface switching service (ISS) comprises a network control logic and a network HTTP proxy. The network control logic receives instructions from the NIA component, and sends signal to the users to switch between the WIFI network and LTE network through the LTE network based upon signal strength of the users. The data flows for HTTP download traffic to the users employ the network HTTP proxy, and the data flows for HTTP video and streaming does not use the network HTTP proxy to avoid backhauling traffic through the WiFi and LTE network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a table illustrating an algorithm used by the network interface assignment (NIA) component of the ATOM architecture, in accordance with one embodiment of the present disclosure.

DETAILED DESCRIPTION OF PREFERRED EMBODIMENTS

Figure 1:
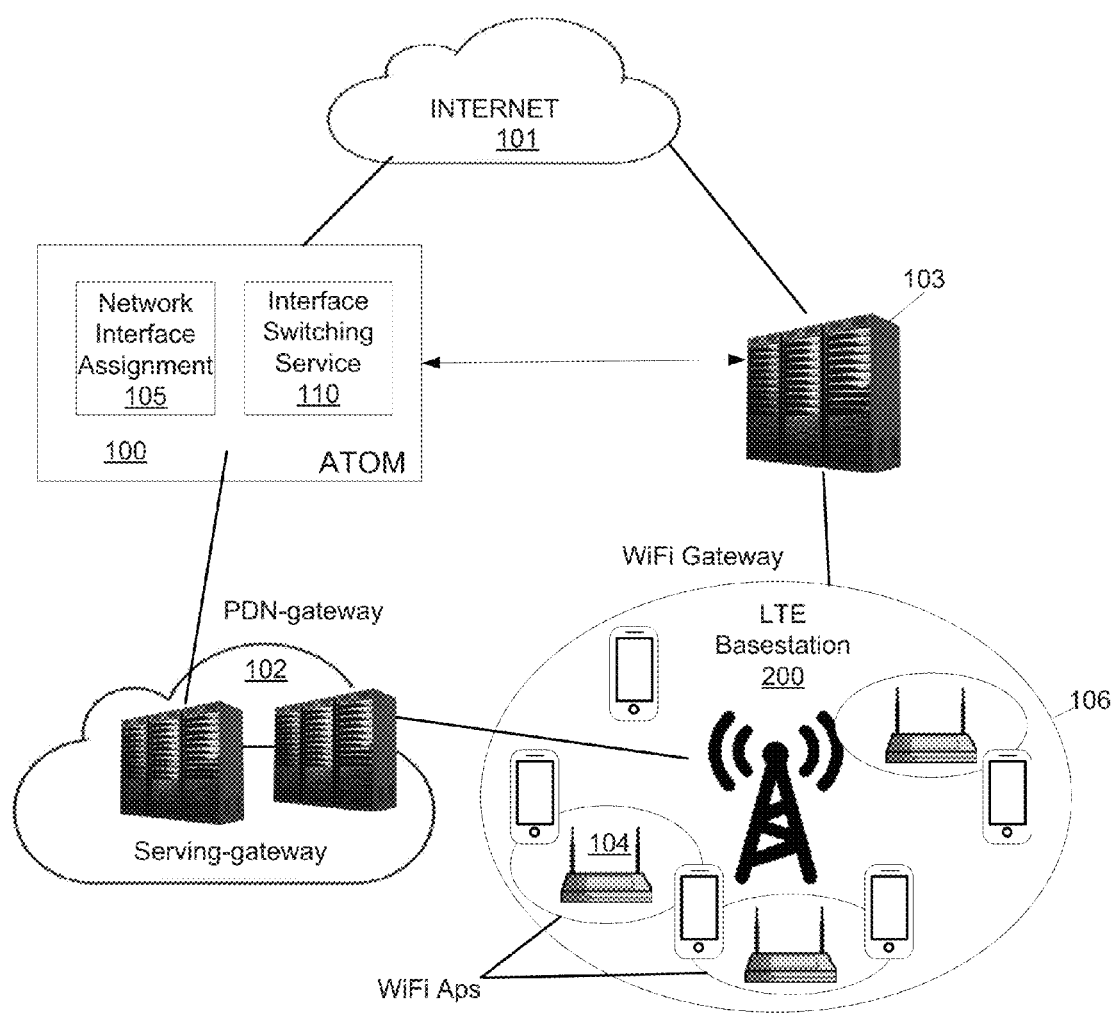
FIG. 1 is a schematic view depicting one embodiment of the architecture of An Intelligent Traffic Offloading Manager (ATOM) that includes a network interface assignment component and an interface switching service component, in accordance with the present disclosure.

The present principles are directed to WiFi offloading in cellular networks. With the advent of 4G LTE networks that offer superior data rates to traditional 3G networks, a unified bandwidth management framework that leverages both the licensed and the unlicensed spectrum can be critical to ensure effective use of wireless resources.

As used herein, "WiFi" denotes access the internet, in which WiFi initiates the connection between personal devices, such as laptops, tablets, smartphones, and a WiFi device or router by using radio waves. The term "WiFi" is interchangeable with the trademark Wi-Fi® throughout the present disclosure.

As used herein, LTE, an abbreviation for Long-Term Evolution, commonly marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. In some embodiments, LTE may provide peak download rates up to 299.6 Mbit/s and upload rates up to 75.4 Mbit/s depending on the user equipment category (with 4×4 antennas using 20 MHz of spectrum).

In some embodiments, the attributes desired of such a framework and solution are: (i) it should be light-weight and scalable; (ii) it should dynamically adapt to flow arrivals, departures and changing link conditions of the clients; (iii) it should be fine-grained, allowing for different application sessions/flows to pick different interfaces with the objective of improving user quality of experience (QoE); (iv) it must not require any changes to and be compatible with current 3GPP LTE standards, making it readily deployable; and (v) it must be capable of seamlessly switching the interface of existing flows to ensure adaptiveness to the dynamic conditions of a mobile network. However, this capability also poses a requirement to backhaul all the traffic from WiFi hotspots to the LTE mobile core network, thereby significantly increasing the operational costs for operators, and hence hindering deployment. Thus, the key challenge is to not just design a scalable, efficient and fine-grained traffic management solution, but to also build a system that can be readily deployed as well as seamlessly integrated with any operator's core network with minimal overhead.

Towards the above goal, the methods, systems and computer product programs provide for the implementation of ATOM, which is an adaptive traffic management system that can adapt to network dynamics and can intelligently map user flows to the appropriate network interface to improve user QoE, while being practical and standards compatible. Designed for current and next-generation LTE networks, ATOM incorporates two key components: (i) a traffic management solution that includes a practical yet effective, greedy algorithm for interface selection that operates at the granularity of application sessions; and (ii) a switching service that seamlessly changes the network interface for ongoing user flows without the need for tight data plane integration.

In some embodiments, certain characteristics of HTTP-based video streaming and Web browsing can be exploited to enable seamless re-direction of flows across different network interfaces. By leveraging existing HTTP proxies, and thus avoiding backhauling WiFi traffic to the LTE mobile core network, ATOM offers an attractive low cost solution. ATOM may be implemented on a real world heterogeneous LTE-WiFi network. A noteworthy aspect of ATOM's implementation is that it is operator-agnostic and standards-compatible, and can hence be readily deployed for any operator looking to manage its LTE and WIFI networks efficiently. Further details regarding the methods, systems and computer program products that are disclosed herein are now described with more detail with reference to FIGS. 1-5.

FIG. 1 depicts one embodiment of an intelligent Traffic Offloading Manager (ATOM) architecture 100 for use with the methods, systems and computer program products of the present disclosure. FIG. 1 depicts that the ATOM 100 is connected to the internet 101, a PDN-gateway 102 and a WiFi gateway 103. A 4G LTE network mainly consists of two parts, i.e., the Evolved Packet Core (EPC) network and the Radio Access Network (RAN). The data plane functionality in EPC is split between the serving gateway and the packet data network gateway (PDN-gateway 102). The PDN-gateway 103 in connected to multiple serving gateways and routes user traffic to towards the external network, i.e., the LTE basestation 200. In addition to routing, the PDN-gateway 103 ensures policy enforcement for resource management and includes packet filtering and charging functions. Still referring to FIG. 1, the LTE basestations 200 incorporate downlink and uplink media access (MAC) schedulers, which achieve wireless resource allocation across multiple user flows. There are typically multiple WiFi access points (WiFi Aps) 104 in a single LTE cell provided by an LTE basestation 200. There are also multiple users 106 within the single LTE cell. The WiFi access points 104 direct traffic to and from the internet 101 through a WiFi gateway 103.

In some embodiments, the ATOM is an end-end traffic management system that (a) enables mobile operators to effectively manage user flows in a fine-grained manner across a heterogeneous cellular network comprised of LTE and WiFi access points (APs) to optimize (i) user QoE and (ii) network resource utilization; (b) includes a seamless interface switching framework that is operator-agnostic and intelligently reduces the amount of backhaul traffic from WiFi in the LTE mobile core network thereby accelerating deployment.

In some embodiments, key design considerations for the ATOM architecture 100 include:
(i) Network vs Client: ATOM is designed as a centralized network-driven solution for traffic management. This is more efficient resulting in better use of network resources as opposed to a pure client or connection manager based solution that runs as a distributed algorithm. Moreover, in some embodiments, such distributed algorithms may require signaling from the network that violates standards compatibility and introduces additional overhead on the wireless link.
(ii) Scalability: Since traffic from an LTE cell (or base station) is offloaded to the WiFi APs that are within its coverage, ATOM is designed to operate at the level of each LTE cell, i.e., each instance of ATOM manages user flows across a particular LTE cell and WiFi APs that are within its coverage. In addition to keeping the offloading solution scalable, it also allows for easier deployment as it can co-exist with existing inter-cell interference management techniques between LTE cells.

(iii) In-network solution: ATOM can be designed as a gateway level solution that can be integrated with or deployed as a standalone middlebox within the LTE mobile core network as opposed to being deployed within each basestation. Such a deployment has the following benefits: (a) Typically, middleboxes such as deep packet inspection modules (DPIs), Policy engines (PCRF) etc., are placed within the LTE mobile core network, and the ATOM requires integration with these gateways to acquire appropriate information. Hence, in some embodiments, it can be better to co-locate the ATOM with these gateways. (b) Deploying ATOM in each basestation hinders deployability as it may require increase in computational capacity at the basestations.

(iv) Granularity of operation: To ensure that the ATOM is adaptive to changing wireless conditions, it is executed periodically. However, ATOM is executed at coarse timescales (several seconds) and decoupled from the basestation and access point MAC schedulers that are performed at fine time-scales (few miliseconds). Typically, this ensures that the traffic management algorithm is stable avoiding excessive switching of interfaces and is easier to deploy at a higher layer in the network stack.

(v) Pricing/Data Plans: Operators around the world typically charge their users based on two plans: (i) Price per byte, in which users are charged a fixed amount per KB of data, and (ii) tiered data-caps, in which users have a data usage limit (for e.g., 3 GB per month) based on a fixed monthly price. Moreover, in some instances operators offer WiFi service free of cost to their current customers. However, such a pricing model may change as operators promise similar carrier-grade service quality on their WiFi networks as they do on their LTE networks. As pricing plans continue to evolve, ATOM may be designed to incorporate general pricing mechanisms to ensure that its design is applicable to the above described pricing scenarios.

In view of the above design considerations, ATOM 100 is instantiated as a gateway-level solution in the cellular operator's access network external to the basestations 200, as shown in FIG. 1. Since the gateway will typically handle traffic for multiple basestations 200, it hosts multiple ATOM instances, each handling traffic for one basestation 200. In some embodiments, the design of the ATOM 100 comprises of two components: (i) Network Interface Assignment (NIA) component 105, and (ii) the Interface Switching Service (ISS) component 110. These components are now discussed in greater detail.

The network interface assignment component 105, which may also be referred to as the network interface assignment module 105, is the core component of ATOM 100 that performs traffic management across all flows that belong to a given LTE cell. Specifically, it takes as input the signal strength of every user to its potential set of WiFi access points (APs) and the LTE basestation, relative QoS priority (or weights) and the current network interface of each user flow. It then computes the appropriate network interface (i.e., a specific WiFi AP or the LTE basestation) for each user flow. Since the goal of NIA is to maximize QoE for users, variations in QoE should be accounted for across the applications even for the same level of throughput. To capture such variations, the QoE of an application can be represented with the help of a per-application utility function for a user. Similar to resource management problems, the problem of maximizing user QoE can be functionalized as a utility maximization problem that is executed periodically every T units of time:

$$\text{Maximize } \Sigma_{i=1}^{N} U_i(t_i) \quad \text{Equation (1)}$$

where $t_i$ is the average throughput for user flow i, N is the total number of active user flows in a given LTE cell and $U_i$ is the utility function of flow i. The nature of the utility function determines the fairness model across user flows. We assume that the utility functions are concave, non-negative functions. Although such utility functions are suited for elastic traffic, recent advancements in adaptation of non-elastic traffic such as video delivery enables us to treat the latter as elastic traffic as well. Maximizing the summation of the utility for each user flow ensures (a) optimal use of wireless resources from the operators perspective and (b) increased QoE from the users perspective.

In the network model of the present disclosure, ATOM operates at the level of an LTE cell where one or more WiFi APs are deployed within the coverage of that LTE basestation as shown in FIG. 1. ATOM is designed to handle scenarios where the coverage of several WiFi APs may overlap resulting in certain users having the option to connect to multiple WiFi APs. Hence, NIA computes the specific WiFi AP or LTE basestation that should be used by each user flow. Since NIA operates at coarse timescales (T is in orders of seconds), it leaves the fine-grained packet (media access controller (MAC)-layer) scheduling function to be performed by the LTE basestation and the WiFi APs locally. Hence, to allow this decoupling, the throughput is modeled as the average throughput received by the client over the time T based on the scheduling policy of the WiFi AP or LTE basestation, which can be formulated as follows:

$$x^* \arg_x{}^{max}\Sigma_{j=0}^{B}\Sigma_{i=1}^{N}x_{ji}U(t_{ji}) \quad \text{Equation (2)}$$

subject to $\Sigma_{j=0}^{B}x_{ji}=1$ where B is the total number of WiFi APs within the coverage of the LTE basestation (represented by j=0). The indicator variable $x=\{x_{ji}, \forall j\}$ denotes the association vector for all the user flows i.e., $x_{ji}=1$ if user flow i is assigned AP j. $t_{ji}$ is the average throughput estimated for user flow I when associated with the AP j. The constraint ensures that exactly one WiFi AP or LTE basestation is chosen for a user flow. Different flows of a user are allowed to pick potentially different WiFi APs. In practice, this can be realized using the virtualization capability found in most WiFi cards to create multiple virtual WiFi networks that can be run on a single WiFi physical interface.

In some embodiments, LTE and WiFi have different medium access (MAC) protocols and can potentially employ distinct fairness (bandwidth sharing) policies across the user flows that directly affects the throughput obtained by the user flows. In some embodiments, LTE basestations typically perform proportional fair scheduling across the user flows. Moreover, a LTE basestation schedules the resources to the user flows in proportion to a weight that defines the relative priorities of the flows. In this case, the achieved throughput of a user can be shown to depend on the total number of the other users as well as their relative weights as follows.

$$t_{ji} = \frac{w_i \times r_{ij}}{\sum_{i \in N_j} w_i} \quad \text{Equation (3)}$$

∀ i ∈ N_j where $w_i$ is the weight for user flow i; $r_{ij}$ is the average link-layer rate (or the PHY rate) of user i on AP j (LTE BS in this case) depending on the average signal-to-noise ratio (SNR) of the user on that AP and $N_j$ is the total number of active users on Ap j.

In some embodiments, WiFi networks when operated distributively, typically employ a throughput-based fairness model. Here, all the users connected to the same AP typically achieve the same throughput at steady state. This can be because the APs typically implement a round-robin scheduling scheme for the downlink packets. In this case, the average downlink throughput of a WiFi user can be expressed as:

$$t_{ji} = \frac{L}{\sum_{i \in N_j} \frac{w_i L}{r_{ij}}}$$  Equation (4)

∀ i ∈ N_j where L is the average size of a packet in bits. In some embodiments, when the operator controls both the LTE and WiFi networks, it can be possible to instrument a uniform fairness policy (say proportional fairness) across both these networks. In this case, the throughput of users in the WiFi APs would follow a throughput model similar to that for LTE.

While the algorithms that are disclosed herein would work with concave utility functions in general, for performance evaluation and guarantees, the methods, systems and computer program products disclosed herein can adopt a logarithm function as the utility function, owing to its popularity in resource management for wireless networks, such as:

$$U(t_i) = \log(t_i)$$  Equation (5)

Such a utility function can ensure that the marginal utility of a flow decreases as the throughput achieved increases. Further, when both LTE and WiFi networks implement a proportional fair scheduling policy, then this would automatically result in maximization of the aggregate of utility functions of all the flows.

In some embodiments, the notion of pricing the different interfaces based on their consumption can be easily incorporated into the utility framework as well as the algorithms. The utility of an interface assignment for a user flow i can be updated as $x_{ij}(U_{(t_{ij})} - E_{ij})$, where $E_{ij}$ is the associated cost for flow i using the interface j and is defined based on the pricing model of the operator.

For example, when the operator employs pricing per byte, $E_{ij}$ can be made to capture consumption in the current epoch as $E_{ij} = C_j w_i$, where $C_j$ is the cost per unit weight of the flow. Since the actual throughput delivered to a flow in an epoch depends on multiple factors, the cost is typically based on the weights, which influences how throughput is shared.

For example, when the operator employs pricing per tired data caps, $E_{ij}$ can capture data usage till the previous epoch as $$E_{ij} = C_j \frac{D_{kj}}{D_{nk}}.$$

would now be the cost per unit KB of data (given by dividing the data cap of the user by the monthly cost of the plan), $D_k$ is the total data usage till the previous epoch by user k on network j, and $n_k$ is the total number of flows at user k, thereby splitting the cost of a user equally across all its flows. Instead of a linear function, one could also consider other functions of data usage. An important point to note is that the pricing is mainly used to serve as a deterrent in picking an interface. By appearing as a constant in a given epoch, it does not directly influence the per-epoch optimization problem.

The Network Interface Assignment (NIA) 105 component proposes and employs a practical and simple yet efficient greedy algorithm, as illustrated by Table 1 titled NIA Algorithm that is depicted in FIG. 2. The algorithm is executed in two steps. It takes as input the number of active user flows N, the number of WiFi APs B within the LTE cell and the subset of user flows Nj that are within the coverage of the WiFi AP j. Also note that the sets Nj may not be independent since certain users may be covered by more than one WiFi AP. Initially all active user flows that are not within the coverage of a WiFi AP are assigned to the LTE base station (i.e., $A_0 \leftarrow N_0$). π represents the set of all the WiFi APs whose users have not been assigned an interface yet and Lj represents the set of user flows that belong to a WiFi AP's coverage but have not been assigned an interface yet (i.e., Lj ⊆ Nj). In the outer loop at every step, NIA considers each WiFi AP, whose user flows remain to be assigned an interface, in isolation. It computes the best combination of user flows across the LTE cell and a particular WiFi AP. It then finalizes the interface assignment for all the user flows of that WiFi AP, which yields the highest utility among all the WiFi APs (step 18). Having fixed the interface assignment for user flows of a WiFi AP in a single round, the initial condition is reset with this assignment. Specifically, the WiFi AP for which the interface assignment is finalized is removed from the set π (Step 19). The user flows that are assigned to an interface are removed from the set Lj of the other WiFi APs (Step 20) that also cover these flows so that they are not considered in the following rounds. The user flows assigned to the LTE basestation are added to the set $A_0$ (Step 21). The computation steps are repeated for each of the remaining WiFi APs until the user flows of all WiFi APs have been assigned an interface. As discussed above, since the assignment of user flows to LTE basestation and a single WiFi AP is also computationally complex, NIA employs a greedy algorithm to compute the assignment in the inner loop (steps 8-17). The inner loop performs the assignment of user flows for each pair of WiFi AP (whose flows have not been assigned an interface yet) and the LTE basestation. Initially, no user flows are assigned to the WiFi AP (Step 9). The assignment for the LTE basestation (Step 10) is initialized with the user flows that are already assigned to LTE ($A_0$) and the unassigned user flows that are within the coverage of the WiFi AP j (Lj). Starting with these initial assignments, NIA moves user flows one by one from the LTE basestation to the WiFi AP such that the incremental utility is maximized. For each user flow, the incremental utility is the difference in utility with the current interface assignment (i.e. LTE) and the interface assignment with the user flow moved to the WiFi AP (Step 12). NIA stops moving user flows from LTE basestation to the WiFi AP when none of the remaining user flows result in a positive increase in the marginal utility. After this step, NIA commits the utility for the particular WiFi AP as shown in step 16.

The goal of the Interface Switching Server (ISS) 110 framework is to provide a service to the NIA 105 to enable dynamically switching the interface or network of user flows to ensure effective traffic management. Every T seconds based on the decisions made by the NIA 105, the ISS 110 switches the network for the appropriate user flows. The fundamental problem in providing seamless connectivity across networks is maintaining the end to end TCP connection since the IP address of the user changes. While standard bodies like 3GPP adopt the approach of maintaining the same IP address by anchoring all the traffic through a common gateway, ISS takes a different, yet seamless and low overhead approach based on two key observations: (i) Mobile operators are resisting tight integration of the data planes of their LTE and WiFi networks to avoid significant increase in backhauling costs for the WiFi traffic. (ii) HTTP is the dominant mobile protocol (over 90% traffic carried over HTTP). More importantly, in some examples, HTTP-based video traffic accounts for more than 60% of the total bytes carried on mobile networks and is expected to increase to more than 75%. Although UDP protocol is more suited for video streaming, HTTP/TCP protocol has been employed widely to leverage existing benefits of HTTP, namely caching, CDNs, traversal through NAT, content naming etc. Keeping the above mentioned observations in mind, ISS 110 intelligently leverages certain characteristics of HTTP-based video streaming and web-browsing to design a switching service that switches network interface of flows without anchoring the connection through a single gateway, thereby avoiding backhauling of WiFi traffic through the LTE core network.

Traditionally HTTP-based video streaming used to be treated like a file download. However, with recent advancements, two popular schemes are employed for HTTP based video streaming: (i) HTTP progressive download (PD) and (ii) Dynamically adaptive streaming over HTTP (DASH). In HTTP progressive download (PD), video players typically request the video in byte ranges instead of downloading the entire video file. HTTP-PD was introduced to ensure video pacing, i.e., the client can request chunks of videos at a download rate that matches the playing rate, and avoid wasting bandwidth in case the user quits the player before the video ends. HTTP-PD also allows users to seek to a later point in the video.

Figure 3:
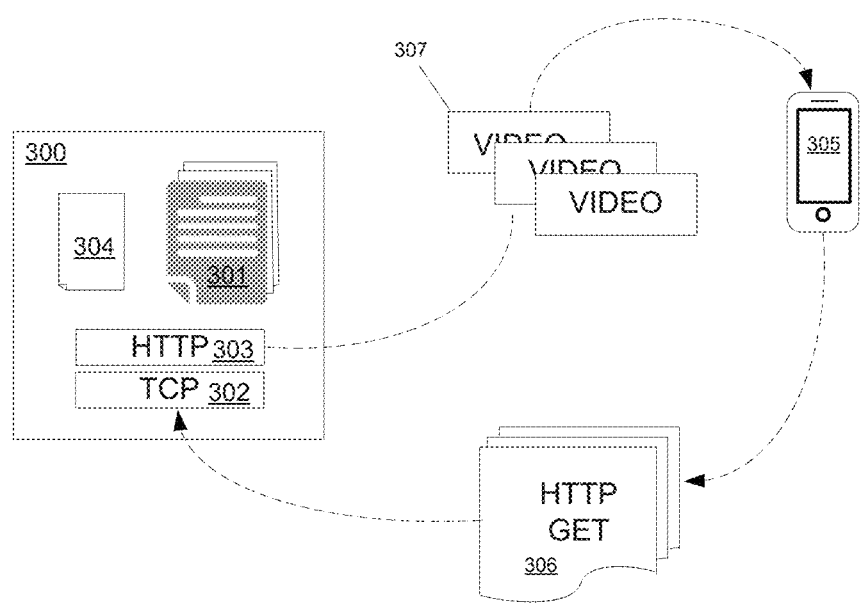
FIG. 3 is a schematic depicting Dynamically Adaptive Streaming over HTTP (DASH) video delivery, in accordance with one embodiment of the present disclosure.

The design of DASH is aligned with HTTP-PD, however it allows the player to request different encoded versions of the video ensuring adaptability to the network conditions. As shown in FIG. 3, the original video 307 is encoded into multiple bit-rates and chunked into segments or chunks 301 that typically contain 4-10 seconds of video. Initially, the player downloads a MPD file containing the URL for each chunk for every encoded version of the video. Periodically, the player 305 sends HTTP-GET requests 306 to the DASH server 300 to download the chunk of the appropriate bit-rate according to measured TCP throughput. Similarly, web or browsing traffic typically consists of several relatively small sized objects (e.g., html, css, js, images etc.), wherein each object is requested by an individual HTTP-GET request.

The ISS framework leverages the above characteristics of HTTP-based video streaming and browsing wherein the content within a session is downloaded using multiple HTTP GET requests over time. Specifically, when the interface or network of these flows have to be switched, subsequent HTTP-GET requests of these flows can be performed over the new interface. Although, typically HTTP-GET requests are multiplexed over existing TCP connections 302, sending HTTP requests over multiple TCP connections in parallel is supported by HTTP 303. Hence, the subsequent HTTP-GET requests 306 are made over one or more TCP connections 302 that are set up over the new interface or network. Although this applies only to HTTP-based video streaming and browsing flows, these traffic flows do not need to be backhauled to the LTE network, thereby saving significant costs for the operator. This is especially important, given that video traffic accounts for a sizable portion of the total bytes carried by mobile networks and web traffic is the most popular traffic type. The dash server 300 that is depicted in FIG. 3 also includes a manifest file 304.

Figure 4:
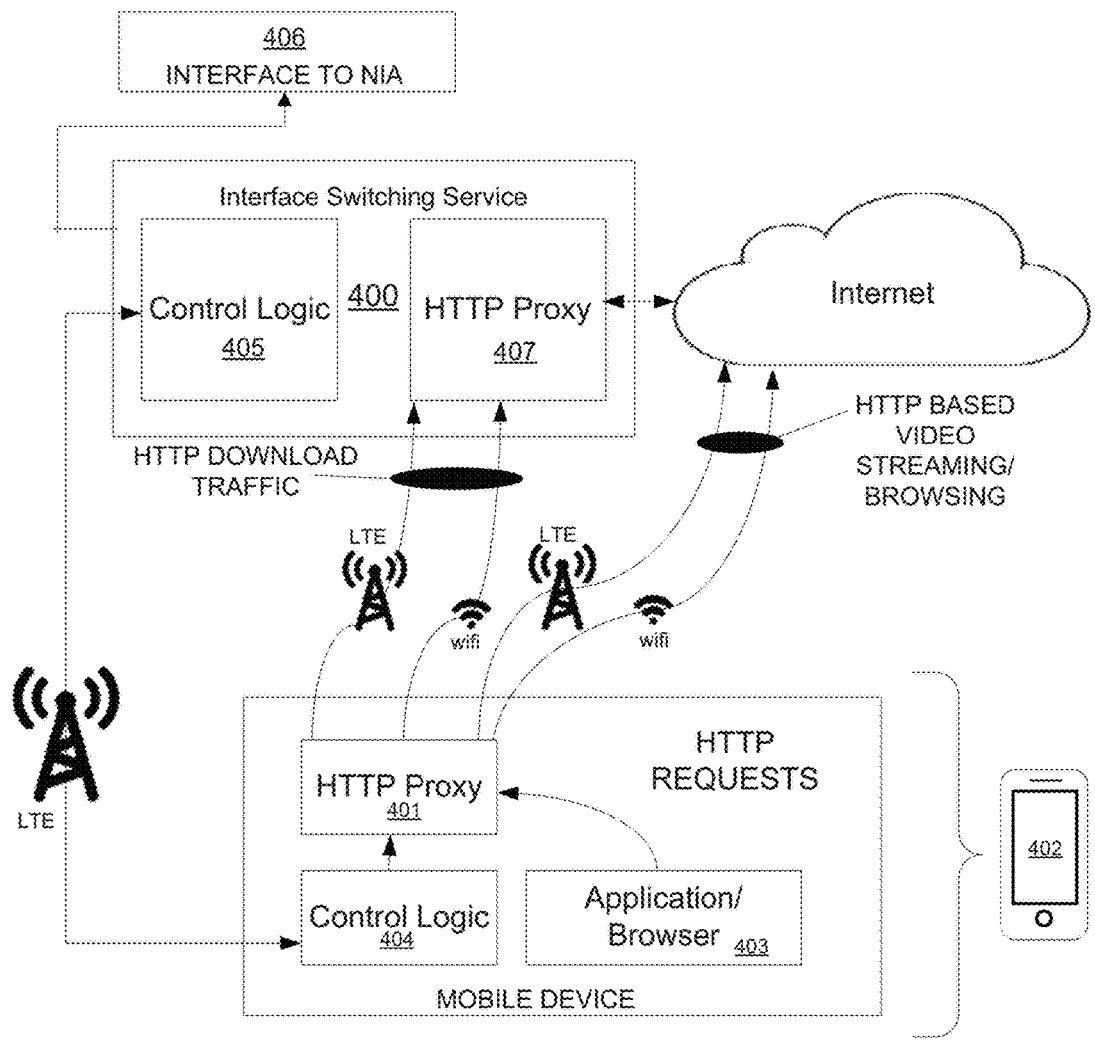
FIG. 4 is a schematic depicting the interface switching service (ISS) component of the ATOM architecture, in accordance with one embodiment of the present disclosure.

In some embodiments, the interface switching service (ISS) is designed using HTTP proxies in the LTE network and a HTTP proxy at the mobile device to enable seamless interface switching on existing mobile networks, as shown in FIG. 4. In some embodiments, the HTTP proxy 401 on the mobile device 402 ensures that the HTTP requests from the applications or browser are sent over the appropriate interface. The applications and the browser on the mobile device 402 are configured to use the HTTP proxy 401. This ensures that all HTTP traffic generated from the device is routed through the HTTP proxy 401 on the device. The HTTP proxy 401 is a light-weight user-space program that is capable of proxying the HTTP request from the application or the browser 403 to either the network proxy or directly to the content servers. The HTTP proxy 401 listens for commands to switch interfaces from the Control Logic 403 on the device 402.

Similarly, on the LTE network-side the ISS framework consists of a HTTP Proxy 407 and a Control Logic 405. The Control Logic 405 exposes an interface for the NIA 406 to send commands for switching the network interfaces of user flows based on the output of the above described algorithm. The network-side Control Logic maintains a persistent TCP connection with the Control Logic on every device through the LTE network to relay the commands from the NIA to the appropriate devices as shown in FIG. 4. The HTTP Proxy 407 within the LTE network is employed for HTTP traffic that excludes video streaming and browsing to ensure seamless switching for other types of traffic. Most mobile operator networks already deploy HTTP proxies in the network for optimizations and caching purposes. The specific procedure of the switching functionality executed by ISS depends on the traffic type of the user flow, i.e., whether the traffic flow is HTTP-based downloads or HTTP-based video streaming and browsing.

HTTP-based downloads are traffic flows that may include downloading of medium to large-sized files (e.g., Dropbox), software updates, and application downloads etc. To ensure that such flows can be seamlessly switched from LTE to WiFi network or vice versa, these flows are routed through the in-network HTTP proxy 407 as shown in FIG. 4. Routing the HTTP traffic through the same proxy for both LTE and WiFi networks ensures that the flow is anchored at a single server, and can be switched seamlessly across the networks. Specifically upon receiving the command to switch interfaces from the ISS, the HTTP proxy 401 on the device 402 sets up a TCP connection with the network HTTP proxy 407 using the new interface. The network HTTP proxy tears down the TCP connection over the current interface before sending data over the new TCP connection to keep the HTTP session alive.

HTTP-based video streaming and browsing are traffic flows, in which unlike HTTP-based downloads, switching is performed differently for video streaming and browsing traffic. Specifically, these flows are not routed through the in-network HTTP proxy 407 as shown in FIG. 4 avoiding backhauling traffic from WiFi to the LTE network. These flows are directed via an LTE basestation or WiFi AP directly to the internet without the in-network HTTP proxy 407. After receiving a command from the control logic 404 to switch the network interface for a specific web session, the HTTP proxy 401 on the device 402 simply requests the subsequent objects from the new interface, while continuing to receive existing objects from the current interface. In a similar fashion, for video flows, upon receiving the command to switch interfaces from the control logic 404, the HTTP proxy 401 in the device 402 simply requests the subsequent chunks of the video from the new interface. By leveraging and instrumenting HTTP proxies 401, 402, ATOM is able to realize a seamless, operator-agnostic interface switching service that can be readily deployed. Further, with video traffic not requiring an in-network HTTP proxy, ATOM is able to avoid backhauling the bulk of the traffic (being video) from the operator's LTE core network as well.

Figure 5:
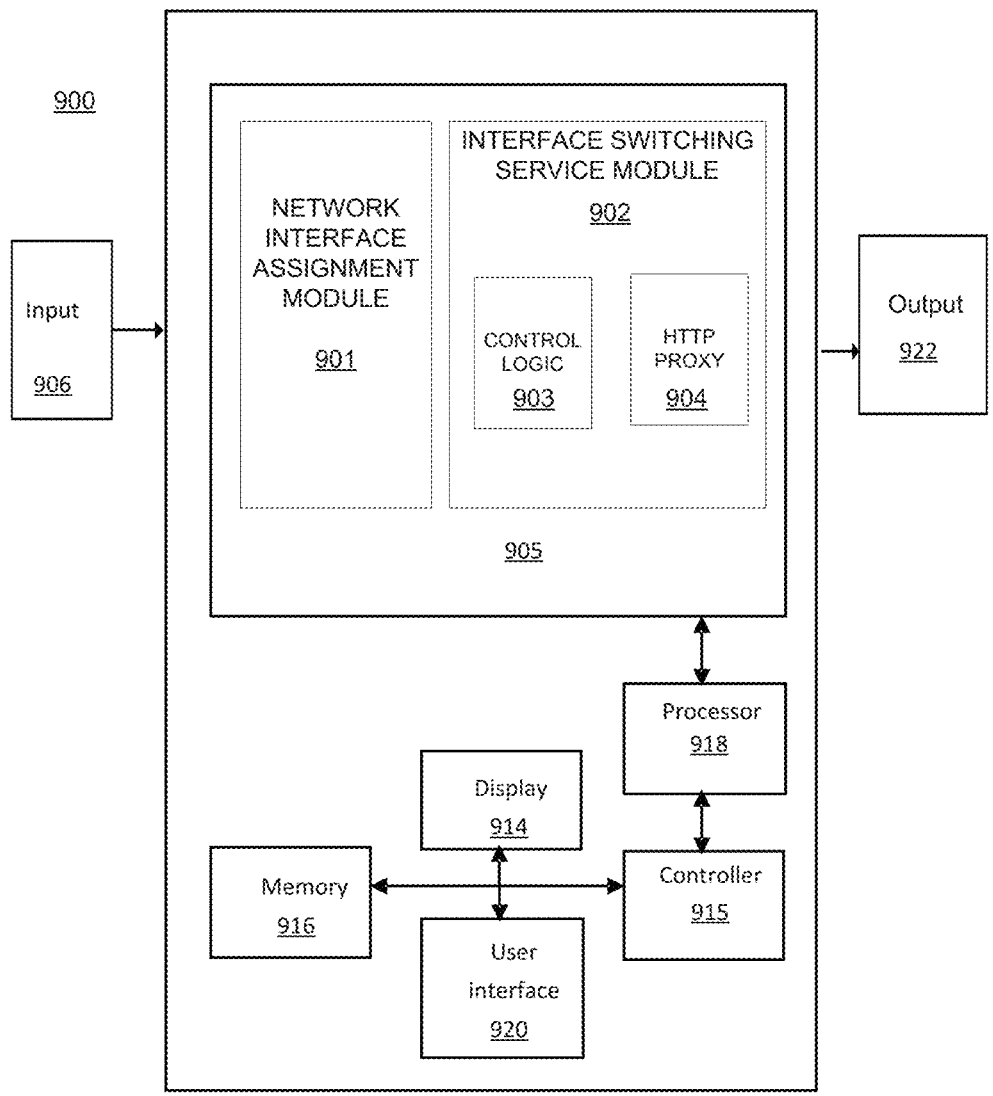
FIG. 5 is a block diagram of a system for controlling traffic through WiFi and cellular networks, in accordance with one embodiment of the present disclosure.

In another aspect of the present disclosure, a system for controlling traffic in WiFi and LTE networks is provided, as depicted in the block diagram this is provided by FIG. 5. The system for controlling traffic in WiFi and LTE networks may include a network interface assignment 901, and an interface switching service module 902. The interface switching service (ISS) module 902 includes modules for a control logic 903 and HTTP proxy 904 component. In one embodiment, the system 900 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 900 may include one or more displays 914 for viewing. The displays 914 may permit a user to interact with the system 900 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 900 may receive input data 906 which may be employed as input to a plurality of modules 905 that provide the module for the long term battery management layer 902 for estimating and managing a life cycle for the battery, and the module for the real time power management layer 904 for managing power sharing between the at least one battery storage element and the at least one capacitor storage element. The system 900 may produce output data 912, which in one embodiment may be displayed on one or more display devices 914. It should be noted that while the above configuration is illustratively depicted, it is contemplated that other sorts of configurations may also be employed according to the present principles. Further details regarding the functionality of the modules 902, 902, 903, and 904 for have been provided above with reference to FIGS. 1-4.

The following examples are provided to further illustrate some aspects of the methods, systems and computer program products that are disclosed herein. The following examples are provided for illustrative purposes only, and in not intended to limit the claimed methods, systems and computer program products to the following description.

EXAMPLES

In one example, the ATOM based system may consists of a NEC LTE basestation (or eNodeB), openEPC software based LTE mobile core network, Madwifi-based WiFi access point and Linux laptops as clients that house both Verizon Pantech LTE dongleS and Broadcom WiFi cards. The NEC LTE basestation is 3GPP Release 9 compliant small cell prototype base station which operates in the 700 Mhz band (Band-13). Code modifications were made to the openEPC components to integrate the basestation with the openEPC network to ensure complete functionality, such as connectivity and data transfer with commercially available LTE clients.

The various components of openEPC are implemented as C modules. In one example, the openEPC components are run over four Intel-based servers such that certain components share the same machine. This limited resource provisioning is sufficient since we run only a small number of flows in our experiments. Our EPC network consists of various components like MME, HSS, PCRF for control plane functions and S-GW and PDN-GW for data path routing. In addition, the Internet gateway provides connectivity to the Internet and includes key functions like NAT, DNS etc.

The components of ATOM for the operator side of the network can be implemented on the Internet gateway that connects directly to the PDN-gateway of the LTE network. NIA is implemented within the Click modular router framework using C++ code, while the ISS control is implemented as a standalone C++ application. A well-defined interface is implemented between the NIA and the ISS. NIA periodically gathers the following information from ISS (a) number of user flows active on LTE basestation and WiFi APs, (b) current interface used by each flow (c) priority/weights of application flows and (d) link-layer or PHY rate of each flow. A control logic component is also implemented within the WiFi gateway that provides information about active user flows over the WiFi APs and the linklayer rate of each WiFi user (collected from the APs) to the ISS-control. Once the NIA gathers all the information in an epoch, it executes the algorithm to compute the network interface assignment for each flow and sends a message to the ISS-control with information about all user flows that need to be switched to a new network interface. The prototype also includes two Squid HTTP proxies in the network side for both LTE and WiFi networks.

On the device at the client side of the network, in one example, the ISS-control framework can be implemented within the Shrpx based HTTP proxy software module that runs as a user-space process. Shrpx is open-source, can be deployed in multiple configurations, supports multiple protocols and can be cross-compiled for Android. The Chrome browser is configured using the PAC (Proxy Auto-Configuration) file to use the Shrpx proxy as the default proxy for all applications. Hence, all the HTTP requests from the Chrome browser can be made to the Shrpx proxy. Initially when the device comes online, the ISS-control on the device establishes a persistent TCP connection and registers using a unique ID with the ISS control on the network side. When a new application flow is initiated, the shrpx proxy always connects using the WiFi network if available. In the case of HTTP-based download flows, the connection is always made to the Squid proxy on the LTE network to ensure seamless mobility. Upon receiving a command to switch the network interface to LTE from ISS-control, the Shrpx proxy establishes a new TCP connection with the Squid Proxy through the LTE network. The Squid proxy then terminates the previous TCP connection over WiFi, before sending HTTP data over the LTE network to ensure seamless continuity of the HTTP session. On the other hand, in the case of HTTP-based video streaming or browsing flows, the initial connection is made to the Squid proxy on the WiFi network avoiding backhauling traffic through the LTE network. Upon receiving a command to switch network interface to LTE from the ISS, the Shrpx proxy establishes a connection with the Squid Proxy on the LTE network and relays all new HTTP requests from the browser through the LTE network. The Shrpx proxy breaks the TCP connection with the Squid proxy over the WiFi network after all the pending HTTP requests have been downloaded. For both traffic types, the same procedure is repeated when a connection has to be switched to WiFi network from LTE. Currently, we employ SPDY as the protocol between Shrpx and the Squid proxies. Although the network (both LTE and WIFI) proxies are not required for HTTP-based video streaming or Web browsing traffic types, it is employed in our prototype since Shrpx is currently not designed to connect to multiple servers. Since most Web servers require multiple simultaneous TCP connections, Shrpx is configured to relay the HTTP requests to the respective Squid proxy based on the current network interface used by the device.

In summary, the high-level execution flow in the current design of ATOM involves the following steps: (i) User flows always initiate the connection from WiFi AP if available and register with the ISS in the network; (ii) NIA executes periodically to make interface selection decision for all active user flows and (iii) NIA sends a command to the ISS consisting of user flows with new interface information. An important aspect of our implementation is that it can be readily deployed by instrumenting existing mobile protocols and is completely standards compatible, while also being operator-agnostic.

As described herein, the methods, systems and computer program products may be entirely hardware or may include both hardware and software elements, which includes but is not limited to firmware, resident software, microcode, etc. Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the Application entitled, "Additional Information", and has the title "A Practical Traffic Management System for Integrated LTE-WiFi Networks". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method of traffic management for data transmission between a WiFi network and an LTE network comprising:
    determining from an operator side of the WiFi network and the LTE network, the number of users on a WiFi network and a number of users on the LTE network, wherein there are multiple access points for the WiFi network within a cell for the LTE network;
    measuring from the operator side congestion of data transmitted on at least the WiFi network; and
    assigning users to the WiFi network and the LTE network using at least one hardware processor in a traffic management system that includes a network interface assignment (NIA) component, and an interface switching service (ISS) component, wherein the interface switching service (ISS) comprises a network control logic and a network HTTP proxy, the network control logic receiving instructions from the NIA component, and sending signal to the users to switch between the WIFI network and LTE network through the LTE network based upon signal strength of the users, wherein data flows for HTTP download traffic to the users employs the network HTTP proxy, and data flows for HTTP video and streaming does not use the network HTTP proxy to avoid backhauling traffic through the WiFi and LTE network.

2. The method of claim 1, wherein the traffic management system is a stand alone component that is middlebox within a mobile core network of the LTE network.

3. The method of claim 1, wherein the traffic management system is executed on a scale of several seconds, and is decoupled from base stations to the LTE network on a scale of miliseconds.

4. The method of claim 1, wherein the traffic management system handles user traffic for multiple LTE base stations.

5. The method of claim 1, wherein the NIA takes input strength for all uses to all potential WiFi access points and LTE base stations, and computes a set of WiFi Access Points (APs) and LTE base stations for each user that provides a least costly solution for the operator of the WiFi network and the LTE network, and a highest quality of experience for each of the users.

6. The method of claim 5, wherein the problem of maximizing user QoE is functionalized as a utility maximization problem that is executed periodically every T units of time:

$$\text{Maximize} \Sigma_{i=1}^{N} U_i(t_i)$$

where $t_i$ is the average throughput for user flow i, N is the total number of active user flows in a given LTE cell and $U_i$ is the utility function of flow i.

7. The method of claim 5, wherein the NIA employs a greedy algorithm.

8. The method of claim 1, wherein the NIA is in communication with the ISS, wherein the control logic of the ISS is in communication with the users through the LTE network.

9. The method of claim 1, wherein the control logic of the ISS receives instructions from the NIA, and the control logic is in communication with the control logic on a device of the user, the control logic on the device of the user communicates to a device HTTP proxy.

10. A system for traffic management between a WiFi network and an LTE network comprising:
   a network interface assignment module for determining from an operator side of the WiFi network and the LTE network a set of WiFi Access Points (APs) and LTE base stations for each user that provides a least a highest quality of experience for each of the users using input strength for all users to all potential WiFi access points and LTE base stations; and
   an interface switching service (ISS) module that comprises a control logic and a network HTTP proxy for delivering network switching instructions to devices of users, the control logic receiving instructions from the NIA module and sending signal to the devices of the users to switch from WIFI and LTE networks through the LTE network based upon signal strength of the users, wherein data flows for HTTP download traffic to the users employs the network HTTP proxy, and data flows for the HTTP video and streaming do not use the network HTTP proxy to avoid backhauling traffic through the WiFi and LTE network.

11. The system of claim 10, wherein the system for traffic management is a stand alone component that is middlebox within a mobile core network of the LTE network.

12. The system of claim 10, wherein the system for traffic management is executed on a scale of several seconds, and is decoupled from base stations to the LTE network on a scale of miliseconds.

13. The system of claim 10, wherein the system of traffic management handles user traffic for multiple LTE base stations.

14. The system of claim 10, wherein the NIA takes input strength for all uses to all potential WiFi access points and LTE base stations, and computes a set of WiFi Access Points (APs) and LTE base stations for each user that provides a least costly solution for the operator of the WiFi network and the LTE network, and a highest quality of experience for each of the users.

15. The system of claim 14, wherein the problem of maximizing user QoE is functionalized as a utility maximization problem that is executed periodically every T units of time:

$$\text{Maximize} \Sigma_{i=1}^{N} U_i(t_i)$$

where $t_i$ is the average throughput for user flow i, N is the total number of active user flows in a given LTE cell and $U_i$ is the utility function of flow i.

16. The system of claim 10, wherein the NIA employs a greedy algorithm.

17. A computer program product comprising a non-transitory computer readable storage medium having computer readable program code embodied therein for performing a method of traffic management for data transmission between a WiFi network and an LTE network, the method comprising:
   determining from an operator side of the WiFi network and the LTE network, the number of users on a WiFi network and a number of users on the LTE network, wherein there are multiple access points for the WiFi network within a cell for the LTE network;
measuring from the operator side congestion of data transmitted on at least the WiFi network; and
   assigning users to the WiFi network and the LTE network using a traffic management system that includes a network interface assignment (NIA) component, and an interface switching service (ISS) component, wherein the interface switching service (ISS) comprises a network control logic and a network HTTP proxy, the network control logic receiving instructions from the NIA component, and sending signal to the users to switch between the WIFI network and LTE network through the LTE network based upon signal strength of the users, wherein data flows for HTTP download traffic to the users employs the network HTTP proxy, and data flows for HTTP video and streaming does not use the network HTTP proxy to avoid backhauling traffic through the WiFi and LTE network.

18. The computer program product of claim 17, wherein the traffic management system is a stand alone component that is middlebox within a mobile core network of the LTE network.

19. The computer program product of claim 17, wherein the traffic management system handles user traffic for multiple LTE base stations.

* * * * *